(12) United States Patent
Lazarus et al.

(10) Patent No.: US 9,247,422 B2
(45) Date of Patent: Jan. 26, 2016

(54) CONTENT COMMUNICATION OVER A WIRELESS COMMUNICATION LINK

(75) Inventors: David Lazarus, Elkins Park, PA (US); Deven Vazirani, Aston, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 1442 days.

(21) Appl. No.: 11/948,363

(22) Filed: Nov. 30, 2007

(65) Prior Publication Data

US 2009/0141897 A1    Jun. 4, 2009

(51) Int. Cl.
*H04L 29/06* (2006.01)
*H04W 12/02* (2009.01)
*H04N 21/418* (2011.01)
*H04N 21/4363* (2011.01)
*H04N 21/4405* (2011.01)
*H04N 21/4408* (2011.01)

(52) U.S. Cl.
CPC ........... *H04W 12/02* (2013.01); *H04N 21/4181* (2013.01); *H04N 21/43637* (2013.01); *H04N 21/4405* (2013.01); *H04N 21/4408* (2013.01)

(58) Field of Classification Search
CPC .............. H04W 12/02; H04N 21/4181; H04N 21/4405; H04N 21/43637; H04N 21/4408

USPC ........................................... 726/29; 380/270
See application file for complete search history.

(56) References Cited

U.S. PATENT DOCUMENTS

| | | | |
|---|---|---|---|
| 6,263,503 B1 * | 7/2001 | Margulis | 725/81 |
| 7,620,179 B2 * | 11/2009 | Fahrny et al. | 380/210 |
| 2006/0059514 A1 * | 3/2006 | Hsiao et al. | 725/42 |
| 2006/0136702 A1 * | 6/2006 | Vantalon et al. | 713/1 |
| 2007/0089144 A1 | 4/2007 | DuBreuil et al. | |
| 2007/0250872 A1 * | 10/2007 | Dua | 725/81 |
| 2008/0155636 A1 * | 6/2008 | Cruz et al. | 725/131 |

* cited by examiner

*Primary Examiner* — Jeffrey D Popham
(74) *Attorney, Agent, or Firm* — Learner, David, Littenberg, Krumholz & Mentlik, LLP

(57) ABSTRACT

In a method of communicating content over a wireless communication link between a base station set-top (BSS) and one or more hosts, where each of the one or more hosts have an interface protocol substantially complying with at least a subset of a copy protection standard, an encrypted signal is at least one of received and stored in the BSS, and the encrypted signal is turned into an encrypted data packet stream. The BSS wirelessly transmits the data packet stream to one or more wireless interface apparatuses (WIAs) which are interfaced with at least one host through the interface protocol. In addition, the WIA forwards the encrypted data packet stream to the one or more hosts through implementation of the interface protocol.

15 Claims, 5 Drawing Sheets

CONTENT COMMUNICATION OVER A WIRELESS COMMUNICATION LINK

BACKGROUND

Cable, satellite, and terrestrial broadcast service is received into a house through a main cable (or fiber-optic) line supplied from the cable service provider or from an antenna configured to receive content from the satellite or terrestrial broadcast service providers. The main cable line is typically routed through the walls of the house and into set-top boxes arranged to pass content from the service providers to one or more television sets. The content supplied by the service providers is often conditional access (CA) encrypted to substantially prevent unauthorized reception of the content.

The CA encrypted content is typically decrypted by Cable-CARD devices, which comprise separate plug-in cards that are inserted into the set-top boxes, or directly into some newer television sets. The CableCARD devices are also typically configured to copy protection (CP) encrypt the content prior to delivery to the set-top box or the television set to substantially prevent unauthorized reception and the content from the CableCARD and the set-top box or television set. In these instances, the set-top box or the television set is configured to decrypt the CP encrypted content.

Oftentimes, the main cable line is supplied into the house at a relatively long distance away from the television set(s). In addition, many households have a number of different television sets located in different rooms, thereby requiring that the main cable line be split and supplied through a number of walls to the different rooms. As such, a relatively large amount of cabling is typically required in order to supply the television sets with the content supplied over the main cable line. For existing construction, as well as new construction houses, the costs and labor associated with running the cabling inside the walls are relatively high because running the cabling typically requires installers to drill holes through walls, ceilings, studs, and floors and to patch up the holes once the cabling has been run.

A less expensive option would be to run the cabling on the outside of the walls. This option, however, is undesirable because it is aesthetically unpleasant and poses a hazard to those walking past the cabling.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
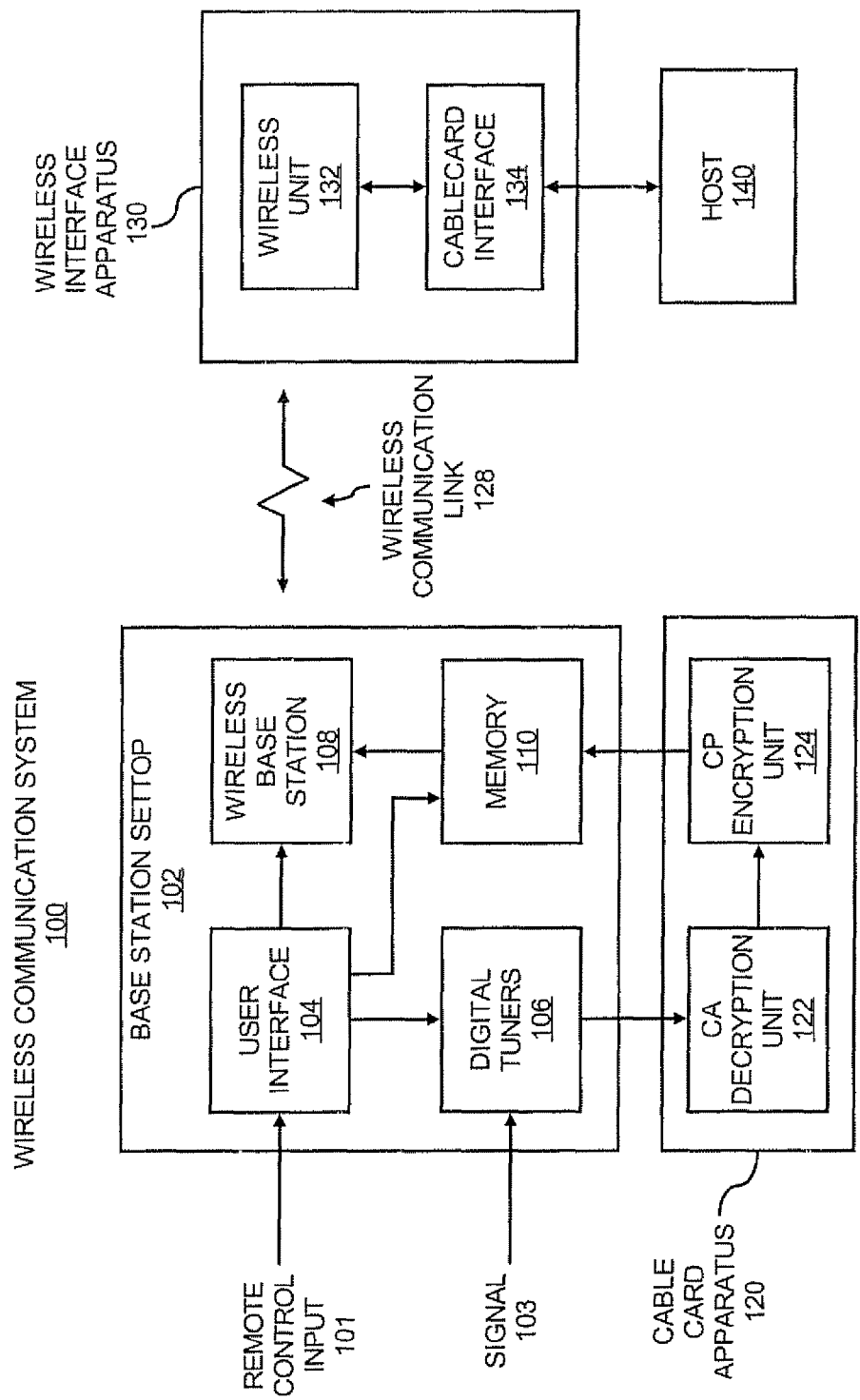
FIG. 1 illustrates a block diagram of a wireless communication system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

In accordance with aspects of the invention, content may be communicated over a wireless communication link between a base station set-top and one or more hosts. The base station set-top may be located remotely from each of the one or more hosts and may be configured to wirelessly transmit data packet streams received from a cable, satellite, fiber, terrestrial broadcast, or IP service provider to the one or more hosts. As such, in an embodiment, the one or more hosts need not be wired to the base station set-top to receive content from a service provider. In addition, the one or more hosts may decrypt and decode the content through implementation of at least a subset of a copy protection standard With reference first to FIG. 1, there is shown a block diagram of a wireless communication system 100, according to an example. It should be understood that the following description of the wireless communication system 100 is but one manner of a variety of different manners in which such a wireless communication system 100 may be configured and operated. In addition, it should be understood that the wireless communication system 100 may include additional components and that some of the components described may be removed and/or modified without departing from a scope of the wireless communication system 100.

The wireless communication system 100 is depicted as including a base station set-top (BSS) 102, one or more content security modules such as cable card apparatus (CCA) 120, a wireless interface apparatus (WIA) 130, and a host 140. The BSS 102 includes a user interface 104, digital tuners 106, a wireless base station 108, and a memory 110. The CCA 120 is depicted as including a conditional access (CA) decryption unit 122 and a copy protection (CP) encryption unit 124. The wireless interface apparatus (WIA) 130 is depicted as including a wireless unit 132 and a cable card interface 134. An illustrative example of the CCA 120 and the cable card interface 134 may comply or substantially comply with a copy protection standard such as the CableCARD standard developed by Cable Television Laboratories, Inc., of Louisville, Colo., or with a subset thereof. In further embodiments, the CCA 120 and the cable card interface 134 may include features that are functionally equivalent to features of a copy protection standard such as the aforementioned Cable-CARD standard, or a subset thereof. In other embodiments, the CCA 120 and the cable card interface 134 need not be limited to compliance with existing or future versions of the CableCARD standard.

Generally speaking, the wireless communication system 100 is employed to wirelessly communicate audio, video, and other types of signals received by the BSS 102 from, for instance, a cable television, a satellite television, a terrestrial broadcast television, an Internet service provider, or other type of provider, to one or more hosts 140. The BSS 102 may be positioned in one location, for instance, where the direct feed from the provider, such as the main cable line, is received and the one or more hosts 140 may be located at various other locations, such as, different rooms where the signals are intended to the received and consumed.

The one or more hosts 140 may comprise one or more electronic devices configured to present or otherwise output the one or more of the signals, such as, televisions, computing devices, receivers, etc. As such, for instance, the BSS 102 may wirelessly deliver the signals fed into a home to the one or more hosts 140 thereby obviating the need to directly wire the BSS 102 to the one or more hosts 140. As discussed in greater detail herein below, the wireless link between the BSS 102 and the one or more hosts 140 is a two-way wireless link implemented through the WIA 130.

Figure 2:
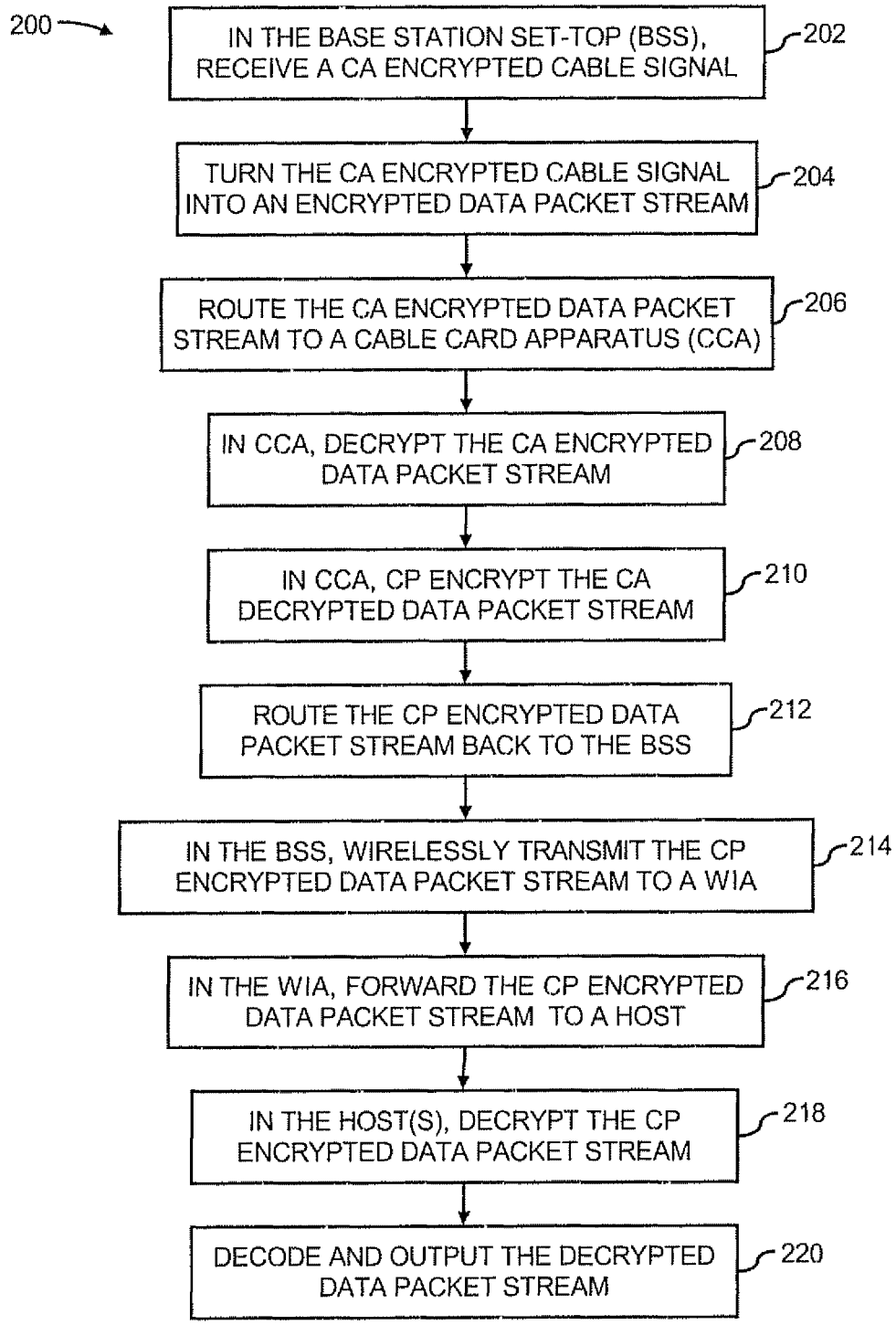
FIG. 2 illustrates a flow diagram of a method of communicating data packet streams over a wireless communication link between a base station set-top and a host, according to an embodiment.

One example of a manner in which the components of the wireless communication system 100 depicted in FIG. 1 operate with respect to each other is described with respect to FIG. 2. FIG. 2, more particularly, depicts a flow diagram of a method 200 of communicating the data packet stream over a wireless communication link between the base station set-top 102 and a host 140. The method 200 is described with respect to FIG. 1 by way of example and not of limitation. It will thus be apparent to one of ordinary skill in the art that the method 200 may be performed with systems other than the wireless communication system 100 depicted in FIG. 1.

At step 202, the digital tuners 106 of the BSS 102 receive a signal 103 from a provider, such as, a cable TV, a satellite TV, terrestrial broadcast TV, fiber, IP, or other type of provider. The digital tuners 106 are also configured to turn the signal 103 into a data packet stream, such as, a stream of MPEG packets, as indicated at step 204. At step 206, the digital tuners 106 are further configured to route the data packet stream, for instance, one or more of MPEG2, MPEG4, and other types of data packets, to the CCA 120.

Typically, when the signal 103 is provided by a subscription-based cable or satellite provider, the signal 103 is MPEG compressed to substantially reduce the bandwidth requirements of the signal 103. In addition, the signal 103 is conditional access (CA) encrypted to substantially prevent unauthorized reception and consumption of the signal 103. As such, the data packet stream (MPEG packets) routed to the CCA 120 at step 206 may also be CA encrypted. The CA decryption unit 122 of the CCA 120 may decrypt the CA encrypted data packet stream, as indicated at step 208.

In addition, the copy protection (CP) encryption unit 124 of the CCA 120 may CP encrypt the CA decrypted data packet stream at step 210. The data packet stream may be CP encrypted to substantially prevent unauthorized consumption of the data packet stream transmitted from the BSS 102 to the WIA 130. In this regard, the CCA 120 may be considered as performing some or all of the functions of a conventional CableCARD apparatus.

Conventionally, CableCARD apparatuses are located at, and connected directly to, a set-top box or television set. As such, in conventional systems, a signal is typically decoded, decrypted, re-encrypted, and re-decrypted at set-top boxes or television sets. However, the arrangement depicted in FIG. 1 differs from conventional arrangements because some or all of the functions of the CableCARD apparatus are performed at the BSS 102. In one example, the BSS 102 may include a slot for receiving the CCA 120, which may comprise a CableCARD apparatus.

In an alternative embodiment, the CCA 120 may comprise circuitry integrated into the BSS 102. In a further illustrative example, CCA 120 can be a content security module integrated into the BSS 102 that has one or more application-specific integrated circuits supporting a downloadable conditional access system, such as the Downloadable Conditional Access System (DCAS) developed by Cable Television Laboratories, Inc., of Louisville, Colo.

At step 212, the CP encrypted data packet stream is routed back to the BSS 102. As shown in FIG. 1, the CP encrypted data packet stream may be routed through the memory 110 and may be stored in the memory 110 for later use, playback, or consumption. In this example, the BSS 102 is configured to store the data packet stream for transmission to the WIA 130 at a later time. The memory 110, however, is considered optional because the CP encrypted data packet stream may be directly routed to the wireless base station 108 without first being stored in the memory 110.

In any regard, at step 214, the wireless base station 108 is configured to wirelessly transmit the CP encrypted data packet stream over a wireless communication link 128. The CP encrypted data packet stream is wirelessly transmitted to enable at least one WIA 130 to receive the CP encrypted data packet stream over the wireless communication link 128 with the BSS 102. As shown in FIG. 1, the WIA 130 includes a wireless unit 132, which may comprise, for instance, a wireless Ethernet card or other device configured to enable the wireless communication link 128 with the wireless base station 108. The wireless communication link 128 may comprise for instance, an IEEE 802.11n link between the wireless base station 108 and a wireless unit 132.

The WIA 130 includes a cable card interface 134 that interfaces with a cable card host interface 142 (FIG. 4) of the host 140. In the example depicted in FIG. 2, the WIA 130 does not perform the functions of a conventional CableCARD device because these functions are performed by the CCA 120. The host 140 may, nevertheless, treat the WIA 130 as a conventional CableCARD device. More particularly, for instance, the host 140 may not be able to distinguish the WIA 130 from a conventional CableCARD device. In addition, the CP encrypted data packet stream may be delivered to the host 140 through an interface between the cable card interface 134 of the WIA 130 and the cable card host interface 142, as indicated at step 216.

According to another example not depicted in FIGS. 1 and 2, the WIA 130 may be configured to perform some or all of the functionalities of the CCA 120. In this example, the WIA 130 may include either or both of the CA decryption unit 122 and the CP encryption unit 124. In addition, the BSS 102 may be configured to wirelessly transmit CA encrypted data packet streams to the WIA 130, which the WIA 130 may CA decrypt as well as CP encrypt prior to forwarding to the host 140.

In any regard, at step 218, the host 140 may decrypt the CP encrypted data packet stream. At step 220, the host 140 may also decode or decompress, for instance, MPEG decode, the decrypted data packet stream and the data packet stream may be outputted, for instance, on a television set, on a computer monitor, etc. In this regard, for instance, the data packet stream may be wirelessly transmitted from the BSS 102 to the host 140 in a compressed and secure manner for consumption by one or more users.

According to an example, the WIA 130 comprises the physical attributes, such as the shape and size of a conventional CableCARD device, such as an S-CARD or an M-CARD. In this example, the host 140 may be configured to receive a conventional CableCARD device, such as is available in various types of set-top boxes and television sets. More particularly, for instance, the host 140 may include a slot originally configured to receive a conventional CableCARD device and the WIA 130 may instead be removably inserted into the slot. In addition, the host 140 may include an interface for connecting to a conventional CableCARD device to which the cable card interface 134 of the WIA 130 may be connected.

According to another example, the WIA 130 may comprise circuitry integrated into the host 140.

In any regard, the host 140 includes an interface protocol that complies with at least a subset of a copy protection standard such as the CableCARD standard developed by Cable Television Laboratories, Inc., of Louisville, Colo. An illustrative example of the cable card host interface 142 may similarly comply with at least a subset of the CableCARD standard. However, the interface protocol and the cable card host interface 142 need not be limited to compliance with existing or future versions of the CableCARD standard. More particularly, for instance, the interface protocol enables communications between the BSS 102 and the host 140. An example of a two-way communication between the BSS 102 and the host 140 through the WIA 130 is shown in FIG. 3.

Figure 3:
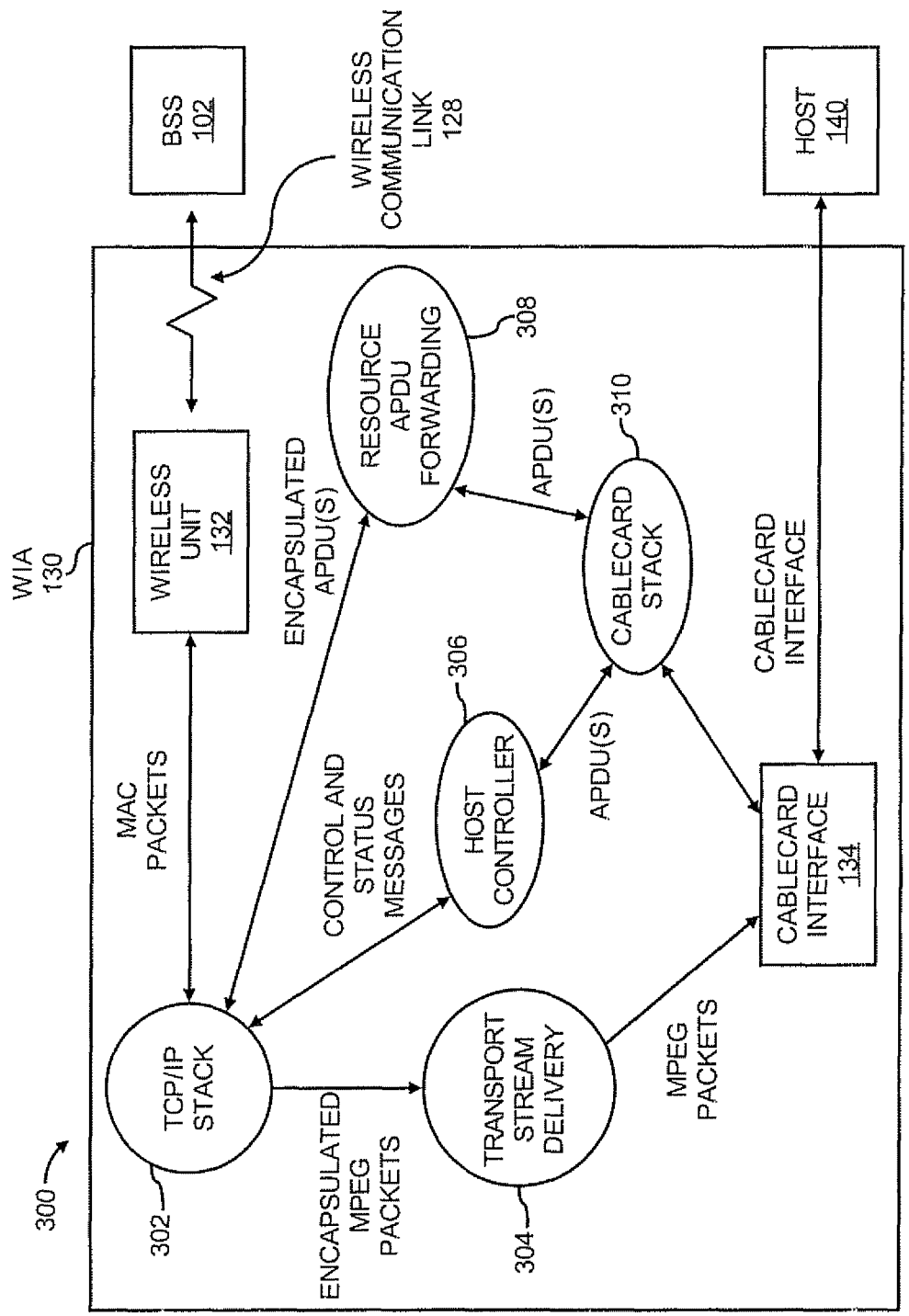
FIG. 3 illustrates a process flow diagram depicting an example of a manner in which a wireless interface apparatus may operate, according to an embodiment.

FIG. 3, more particularly, shows a process flow diagram 300 depicting an example of a manner in which the WIA 130 may operate. It should be understood that the process flow diagram 300 may include additional components and that some of the components described may be removed and/or modified without departing from a scope of the process flow diagram 100. For instance, the data packet stream is described as encapsulated MPEG packets, however, it should be understood that the data packet stream may comprise various different forms without departing from a scope of the WIA 130.

As shown in FIG. 3, in addition to the wireless unit 132 and the cable card interface 134, an illustrative embodiment of the WIA 130 also includes a networking protocol stack 302 (examples of which include TCP/IP, UDP/IP, and RTP stacks), a transport stream delivery 304, a host controller 306, a resource for application protocol data unit (APDU) forwarding 308, and a cable card stack 310. In an embodiment, an APDU is an illustrative example of a protocol message that may be sent or received by the BSS 102 and WIA 130.

The encapsulated MPEG packets received from the BSS 102 through the wireless unit 132 may be in the form of Ethernet frames or similar protocol data units that are delivered to the networking protocol stack 302, such as TCP/IP, UDP/IP, RTP, etc. The networking protocol stack 302 forwards the encapsulated MPEG packets to the transport stream delivery 304, which removes the encapsulation on the MPEG packets and forwards the MPEG packets to the cable card interface 134 and onto the host 140.

The BSS 102 may perform the conditional access operations at the request of the WIA 130. For instance, if the host 140 sends the WIA 130 a protocol message such as an application protocol data unit (APDU), the WIA 130 sends the APDU through the cable card stack 310 and the resource APDU forwarding 308. In addition, the WIA 130 may wirelessly transmit the APDU to the BSS 102 over the wireless communication link 128. Upon receiving the APDU, the BSS 102 processes the APDU by sending it to the CCA 120. If the CCA 120 generates an APDU response, the APDU response is sent back to the WIA 130 over the wireless communication link 128. In addition, the WIA 130 delivers the APDU response to the host 140. In various instances, the WIA 130 or the BSS 102 may intercept, substitute, or inject an APDU to make the wireless communication system 100 operable.

By way of example, a television set may tune to a particular channel and may receive encrypted data on that particular channel. The television set may forward the encrypted data to the WIA 130, which may discard the encrypted data. In addition, the WIA 130 may deliver content supplied from the BSS 102 as if that content is the decrypted version of the encrypted data received on that particular channel.

The host controller 306 may intersect, substitute, or inject APDUs to configure the host 140. The host controller 306 may also ask the host 140 to tune to a particular frequency, send an APDU to the host 140 on behalf of the BSS 102, make acknowledgements, maintain the state of the host 140, etc. In addition, or alternatively, these features may be implemented in the BSS 102.

With reference back to the BSS 102 in FIG. 1, the user interface 104 is configured to receive a remote control input 101, such as, instructions to change channels, instructions to change display settings, instructions to display a channel guide, etc., from one or more users through a remote control device (not shown). The user interface 104 may control one or more of the digital tuners 106, the memory 110, and the wireless base station 108 in response to the remote control input 101. By way of example, the user interface 104 may control the digital tuners 106 to change the channel currently being viewed on the host 140. As another example, the user interface 104 may control the memory 110 to play back the previously recorded program in response to an instruction contained in the remote control input 101.

Figure 4:
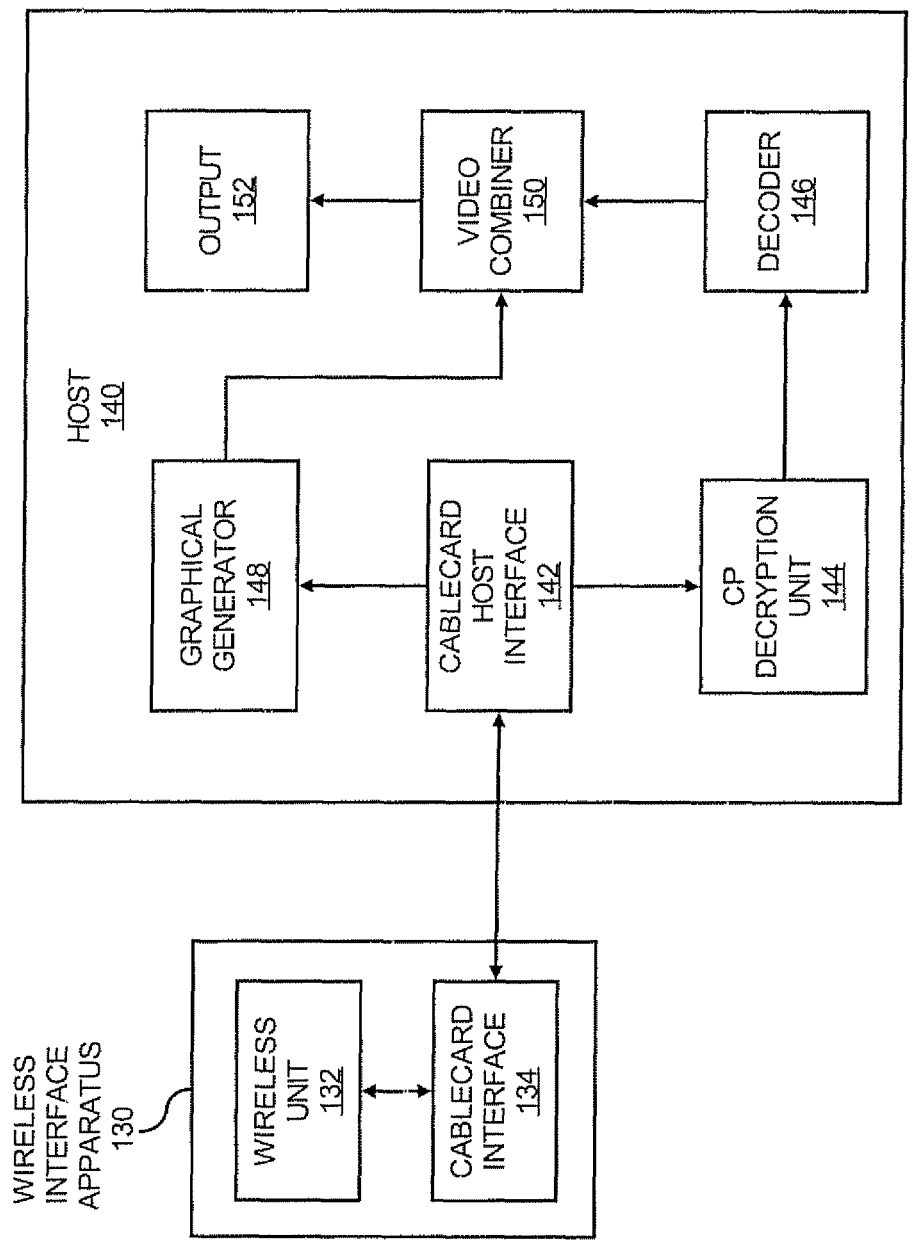
FIG. 4 illustrates a block diagram of a wireless interface apparatus and a host, according to an embodiment.
Figure 5:
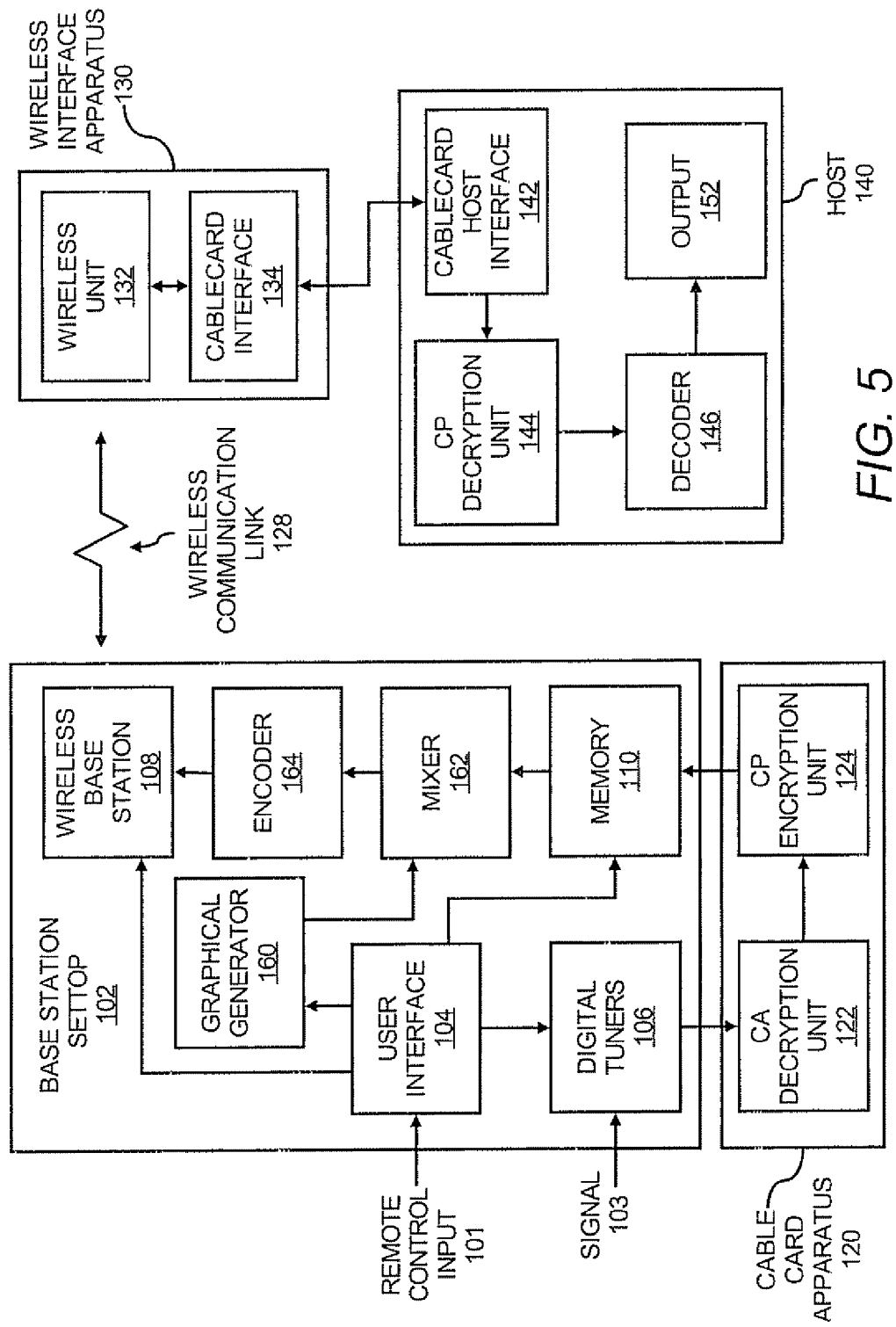
FIG. 5 illustrates a block diagram of a base station set-top, a cable card apparatus, a wireless interface apparatus, and a host, according to an embodiment.

One of the inputs 101 received by the user interface 104 may include an instruction to display graphics that are combined with video; for example, graphics that are laid over, placed below, or otherwise combined with the video displayed on an output 152 (FIG. 4). The graphics may include, for instance, the channel guide, information pertaining to the program being viewed, etc. The graphics may, for example, be laid over, placed below, or otherwise combined by either the host 140 or the BSS 102. An example in which the graphics are laid over, placed below, or otherwise combined by the host 140 is depicted in FIG. 4 and an example in which the graphics are laid over, placed below, or otherwise combined by the BSS 102 is depicted in FIG. 5.

With reference first to FIG. 4, there is shown a block diagram of the WIA 130 and the host 140, according to an example. FIG. 4 depicts exemplary components contained in the host 140 in greater detail. As shown therein, the host 140 includes a cable card host interface 142 configured to interface with the cable card interface 134 of the WIA 130. In this example, the host 140 receives the CP encrypted data packet stream along with the message. The CP encrypted data packet stream is delivered to a CP decryption unit 144, which decrypts the CP encrypted data packet stream. In addition, the decrypted data packet stream is delivered to a decoder 146, which decompresses the data packet stream. For instance, the decoder 146 generates one or more planes of decompressed video. The decoder 146 also forwards the decompressed video to a video combiner 150.

In this example, the host 140 includes a private resource (e.g., a software-implemented feature of host interface 142) that allows the host 140 to receive and perform graphics commands sent by WIA 130 to host 140; e.g., graphics commands received by WIA 130 from BSS 102 via the wireless communication link 128. For instance, the messages or functions of the wireless communication link 128 may match an API provided by a base platform that is used by the user interface 104. When the user interface calls the API (or underlying graphics function) to perform a graphical operation, the parameters for the API call are placed into a message and are sent to the WIA 130. Once the WIA 130 receives the message, the WIA 130 sends the message to the host 140 (e.g., via cable card interface 134), asking the host 140 to perform the graphics and video mixing operation.

The cable card host interface 142 receives the message, and using the private resource, delivers the message to a graphical generator 148. In addition, the graphical generator 148 renders the graphics, such as, characters, shapes, colors, etc., specified in the message in one or more graphics planes. The graphical generator 148 also forwards the rendered graphics to the video combiner 150. The video combiner 150 combines the decompressed video and the rendered graphics and outputs it to an output 152, such as, a television display, a computer monitor, etc. In this regard, a combination of the video and the rendered graphics is displayed on the output 152, such as, when a channel guide is displayed with a video program.

In a further embodiment, the private resource of host 140 also allows the WIA 130 to command the host 140 to receive and to decode packets received by WIA 130 via the wireless communication link 128. Control of the host 140 by the WIA 130 can simplify configuration of host 140 during initialization, and can allow flexible control of host 140 during normal operation of the user interface 104. Such a private resource can allow control of television functions; e.g., parameters that can conventionally be controlled by a remote control. Certain parameters may feature bidirectional controls, such as up and down, higher and lower, left and right, or front and rear. Illustrative examples of such parameters include Audio Volume, Stereo Balance, Video Brightness, Video Contrast, and Video Saturation. Other exemplary television functions that can be controllable in this manner can include a specified value (e.g., a numerical, boolean, or enumerated value) for the parameter, illustrative examples of which are shown and defined in Table 1.

TABLE 1

| Parameter | Exemplary values |
| --- | --- |
| Control mode | Independent = TV/Host 140 is operating independently from the BSS 102<br>W-CARD = TV/Host 140 is a slave to the BSS 102 |
| video Encoding | MPEG2 = MPEG2 encoding<br>MPEG4 = MPEG4 encoding |
| Power | On = TV/Host 140 is powered on<br>Standby = TV/Host 104 is either powered off or is in a low-power mode |

With reference now to FIG. 5, there is shown a block diagram of the BSS 102, the CCA 120, the WIA 130, and the host 140, according to an example. As shown in FIG. 5, the BSS 102 includes a graphical generator 160, a mixer 162, and an encoder 164. In this example, the user interface 104 delivers graphics commands to the graphical generator 160, which renders the graphics, such as, characters, shapes, colors, etc., specified in the graphic commands. In addition, the rendered graphics are delivered to the mixer 162, which overlays, places below, or otherwise combines the rendered graphics with and the CP encrypted data packet stream. The combined rendered graphics and the CP encrypted data packet stream are communicated to the encoder 164, which encodes the rendered graphics and the CP encrypted data packet stream. Furthermore, the encoded data packet stream is delivered to the wireless base station 108, which wirelessly transmits the encoded data packet stream, which includes the rendered graphics for display on the output 152 of the host 140.

In this example, the WIA 130 receives the encoded data packet stream and forwards those to the host 140, which decrypts and decodes the rendered graphics and the CP encrypted data packet stream. The host 140 also outputs the rendered graphics and the CP decrypted and decoded data packet stream as combined video and rendered graphics on the output 152.

In either or both of FIGS. 4 and 5, the remote control input 101 may include other types of input, such as, audio volume, video brightness, video contrast, video saturation, power, etc. As such, various characteristics of the data provided through the output 152 may be controlled through either the BSS 102 or the host 140.

In addition, although the BSS 102 has been described as providing the data packet stream to a single host 140, it should be understood that the BSS 102 may wirelessly communicate data packet streams to a plurality of hosts 140. In this instance, the BSS 102 may be interfaced with a plurality of different CCAs 120, where each of the CCA's 120 is configured to receive data packet streams from at least one tuner 106 and/or memory 110 and to provide data packet streams to respective ones of the plurality of hosts 140. Furthermore, each of the hosts 140 may be interfaced with a respective WIA 130 to respectively receive the wireless receive the data packet streams.

Through implementation of the methods and systems disclosed herein, content supplied by a cable, satellite, and/or terrestrial broadcast provider may be wirelessly transmitted from the base station set-top to one or more hosts. The content supplied by the content provider is typically CA encrypted and thus the base station set-top may CA decrypt the content and may also CP encrypt the content prior to wirelessly transmitting the content to the one or more hosts. As such, for instance, conventional CableCARD functions may be performed on the supplied content at a location that is remote from the one or more hosts and wirelessly transmitted to the one or more hosts, thereby obviating the need for cabling to provide content on the one or more hosts, and thus, reducing the costs associated with providing content to the one or more hosts.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of communicating content over a wireless communication link between a base station set-top (BSS) and one or more hosts, the method comprising:

transmitting, from the base station set-top (BSS) a conditional access (CA) encrypted data packet stream to a cable card apparatus (CCA) that is physically connectable to the BSS and complies with at least a subset of a copy protection standard;

wherein the BSS is configured to wirelessly communicate data packet streams to a plurality of hosts, each of the plurality of hosts interfaced with the BSS via a respective wireless interface apparatus (WIA) using an interface protocol corresponding to the copy protection standard associated with the CCA, and wherein the BSS is configured to perform conditional access operations at the request of the respective WIA;

receiving, at the BSS, a copy protected (CP) encrypted data packet stream generated by the CCA by decrypting the CA encrypted data packet stream, via an authorized CA decryptor, and CP encrypting the CA decrypted data packet stream via a CP encryption unit in accordance with the copy protection standard;

wirelessly transmitting the CP encrypted data packet stream from the BSS to one of the plurality of hosts via a respective WIA not physically coupled to the BSS and interfaced with the host through the interface protocol, wherein at least one of the plurality of hosts or its respective WIA is configured to decrypt the CP encrypted data packet stream via a CP decryption unit that corresponds to the CP encryption unit.

2. The method according to claim 1, further comprising in the BSS, sending a graphics command to the host paired with the CCA, the host paired with the CCA configured to render the graphics command, combine the rendered graphics with the CP encrypted data packet stream and output the combined rendered graphics and the CP encrypted data packet stream, such that graphics are combined with video from the CP encrypted data packet stream.

3. The method according to claim 1, further comprising:
rendering, in the BSS, a graphics command;
receiving, the CP encrypted data packet stream generated by the CCA, which is generated by the CCA mixing rendered graphics from the graphics command with the CA decrypted data packet stream;
encoding the CP encrypted data packet stream; and
wirelessly transmitting the mixed rendered graphics and CP encrypted data packet stream to the WIA for transmission to a host paired with the CCA configured to decode the CP encrypted data packet stream and to display the mixed graphics and decoded CP encrypted data packet stream, such that, the graphics are at least one of displayed over, displayed below, and combined with video from the decoded CP encrypted data packet stream.

4. The method according to claim 1, wherein receiving, at the BSS, a CP encrypted data packet stream from the CCA comprises:
storing the CP encrypted data packet stream in a memory included in the BSS.

5. The method according to claim 1, further comprising:
receiving, at the BSS, a protocol message from the WIA, which received the protocol message from one of the one or more hosts and wirelessly transmits the protocol message to the BSS;
routing the protocol message to a content security module;
receiving, at the BSS, a protocol message response from the content security module;
wirelessly transmitting the protocol message response from the BSS to the WIA, which is configured to deliver the protocol message response to the at least one of the plurality of hosts.

6. A system for wirelessly communicating content to one or more hosts, said system comprising:
a base station set-top (BSS) configured to:
transmit a conditional access (CA) encrypted data packet stream to a cable card apparatus (CCA);
wherein the BSS is configured to wirelessly communicate data packet streams to a plurality of hosts, each of the plurality of hosts interfaced with the BSS via a respective wireless interface apparatus (WIA) using an interface protocol corresponding to the copy protection standard associated with the CCA and wherein the BSS is configured to perform conditional access operations at the request of the respective WIA;
the CCA being physically connectable to the BSS and complying with at least a subset of a copy protection standard, the CCA configured to:
generate a CA decrypted data packet stream by decrypting the CA encrypted data packet stream via an authorized CA decryptor, and
generate a copy protected (CP) encrypted data packet stream by CP encrypting the CA decrypted data packet stream via a CP encryption unit in accordance with the copy protection standard, the CCA transmitting the CP encrypted data packet stream to the BSS;
the respective WIA wirelessly coupled to the BSS for at least one of the plurality of hosts and configured to:
wirelessly receive the CP encrypted data packet stream from the BSS
and transmit the CP encrypted or decrypted data packet stream to the single host associated with the CCA using the interface protocol,
wherein the at least one of the plurality of hosts or its respective WIA is configured to decrypt the CP encrypted data packet stream via a CP decryption unit that corresponds to the CCA CP encryption unit.

7. The system according to claim 6, wherein the BSS is further configured to send a graphics command to the at least one of the plurality of hosts associated with the CCA, wherein the at least one of the hosts further includes a graphical generator configured to render the graphics command, a video combiner configured to combine the rendered graphics with the decrypted data packet stream to display the rendered graphics combined with video from the data packet streams.

8. The system according to claim 6, wherein the single host associated with the CCA is configured to receive and implement a command from the one or more WIAs for control of a television function.

9. The system according to claim 6, wherein the BSS includes a graphical generator configured to render a graphics command, a mixer for mixing the rendered graphics from the graphics command with the data packet stream, and an encoder to encode the mixed rendered graphics and data packet stream, wherein the BSS is further configured to wirelessly transmit the encoded graphics and data packet stream to the one or more WIAs, which communicate the encoded graphics and data packet stream to the single host associated with the CCA including decoders for decoding the encoded graphics and data packet stream.

10. The system according to claim 6, wherein the WIA is configured to receive a protocol message from the single host associated with the CCA and to wirelessly transmit the protocol message to the BSS, wherein the BSS is configured to route the protocol message to a content security module configured to generate a protocol message response and to route the protocol message response to the BSS, wherein the BSS is configured to wirelessly transmit the protocol message response to the WIA, and wherein the WIA is further configured to transmit the protocol message response to the single host associated with the CCA.

11. A base station set-top (BSS) having an interface protocol complying with at least a subset of a copy protection standard, said BSS comprising:
one or more digital tuners for receiving an encrypted signal, wherein the one or more digital tuners are configured to turn the encrypted signal into a conditional access (CA) encrypted data packet stream;
a content security module coupled to the one or more digital tuners, the content security module configured to:
receive the CA encrypted data packet stream,
generate a CA decrypted data packet stream by decrypting the CA encrypted data packet stream via an authorized CA decryptor, and
generate a copy protected (CP) encrypted data packet stream by CP encrypting the CA decrypted data packet stream, the content security module transmitting the CP encrypted data packet stream to the BSS; and
a wireless base station coupled to the security module, wherein the BSS is configured to perform conditional access operations at the request of a wireless interface apparatus (WIA) and to wirelessly communicate data packet streams to a plurality of hosts, each of the plurality of hosts interfaced with the BSS via at least one respective (WIA) using an interface protocol corresponding to the copy protection standard associated with the content security module, the wireless base station configured to:
- receive the CP encrypted data packet stream generated by the content security module, and
- wirelessly transmit the CP encrypted data packet stream to one or more of the WIAs, and
- transmit the CP encrypted or decrypted data to one of the plurality of hosts interfaced with the respective wireless base station through implementation of the interface protocol.

12. The base station set-top according to claim 11, further comprising at least one slot having a cable card interface for physically connecting to the content security module.

13. The base station set-top according to claim 11, further comprising one or more application-specific integrated circuits supporting a downloadable conditional access system.

14. The base station set-top according to claim 11, wherein the content security module comprises a CableCARD apparatus.

15. The base station set-top according to claim 11, further comprising:
- a user interface for receiving command inputs from one or more users;
- a graphical generator configured to render graphics from a graphics command;
- a mixer coupled to the graphical generator and to the content security module, the mixer for mixing the graphics and the CP encrypted data packet stream; and
- an encoder coupled to the mixer, the encoder configured to encode the mixed graphics and the CP encrypted data packet stream, and wherein the wireless base station is further configured to wirelessly transmit a data packet stream formed of the combined encoded graphics and the CP encrypted data packet stream to the one or more WIAs.

* * * * *